United States Patent

Moher

(10) Patent No.: US 9,614,658 B2
(45) Date of Patent: Apr. 4, 2017

(54) SYSTEM AND METHOD FOR RADIO FULL DUPLEX

(71) Applicant: Huawei Technologies Co., Ltd., Shenzhen (CN)

(72) Inventor: Michael Moher, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 14/310,932

(22) Filed: Jun. 20, 2014

(65) Prior Publication Data
US 2015/0372799 A1 Dec. 24, 2015

(51) Int. Cl.
*H04L 5/14* (2006.01)
*H04B 17/10* (2015.01)
*H04B 17/16* (2015.01)
*H04L 25/02* (2006.01)
*H04B 17/391* (2015.01)
*H04B 1/403* (2015.01)
*H04L 5/00* (2006.01)

(52) U.S. Cl.
CPC ........... *H04L 5/1461* (2013.01); *H04B 1/406* (2013.01); *H04B 17/103* (2015.01); *H04B 17/16* (2015.01); *H04B 17/3911* (2015.01); *H04L 25/025* (2013.01); *H04L 5/0007* (2013.01)

(58) Field of Classification Search
None
See application file for complete search history.

(56) References Cited

U.S. PATENT DOCUMENTS

| 7,768,876 | B2 * | 8/2010 | Dahl | H04L 25/0212 367/135 |
| 2002/0176490 | A1 * | 11/2002 | Kamali | H04B 3/46 375/222 |
| 2003/0095591 | A1 * | 5/2003 | Rekai | H04B 3/46 375/225 |

(Continued)

FOREIGN PATENT DOCUMENTS

| CN | 101420246 A | 4/2009 |
| CN | 102769487 A | 11/2012 |

(Continued)

OTHER PUBLICATIONS

PCT International Search Report and Written Opinion, PCT/CN2015/081812, Applicant: Huawei Technologies Co., Ltd., dated Sep. 30, 2015, 11 pages.

*Primary Examiner* — Chirag Shah
*Assistant Examiner* — Joshua Smith
(74) *Attorney, Agent, or Firm* — Slater Matsil, LLP

(57) ABSTRACT

In one embodiment, a method for determining self-interference in radio full duplex includes transmitting, by a first radio transmitter and an antenna, a first signal and receiving, by a first radio receiver and the antenna, a reflection of the first signal. The method also includes estimating a channel in accordance with the first signal and the reflection of the first signal to produce an estimated channel and determining a second signal in accordance with the estimated channel. Additionally, the method includes transmitting, by a second radio transmitter, the second signal and removing a self-interference component of the reflection of the first signal to produce a corrected signal.

20 Claims, 4 Drawing Sheets

(56) References Cited

U.S. PATENT DOCUMENTS

| | | |
|---|---|---|
| 2009/0186582 A1 | 7/2009 | Muhammad et al. |
| 2009/0213770 A1 | 8/2009 | Mu |
| 2011/0143655 A1* | 6/2011 | Ahn .................. H04B 7/15542 455/9 |
| 2011/0228828 A1 | 9/2011 | Wang et al. |
| 2011/0244790 A1* | 10/2011 | Kwak ................ H04B 7/15564 455/24 |
| 2012/0195351 A1* | 8/2012 | Banwell ................ H04B 1/525 375/219 |
| 2013/0102254 A1 | 4/2013 | Cyzs et al. |
| 2013/0188760 A1* | 7/2013 | Subramanian ....... H04J 11/0023 375/346 |
| 2013/0286903 A1* | 10/2013 | Khojastepour ........... H04L 5/14 370/280 |
| 2014/0198688 A1* | 7/2014 | Li ......................... H04B 1/525 370/278 |
| 2014/0198691 A1 | 7/2014 | Oberhammer et al. |
| 2014/0219449 A1* | 8/2014 | Shattil .................. H04W 12/04 380/270 |
| 2015/0318976 A1 | 11/2015 | Eltawil et al. |
| 2016/0065318 A1* | 3/2016 | Lee ....................... H04B 15/02 370/276 |

FOREIGN PATENT DOCUMENTS

| | | |
|---|---|---|
| CN | 103117970 A | 5/2013 |
| CN | 103580720 A | 2/2014 |
| WO | 2008048534 A1 | 4/2008 |
| WO | 2014113725 A1 | 7/2014 |

\* cited by examiner

SYSTEM AND METHOD FOR RADIO FULL DUPLEX

TECHNICAL FIELD

The present invention relates to a system and method for wireless communications, and, in particular, to a system and method for radio full duplex.

BACKGROUND

In the field of radio communications, it is desirable to transmit and receive from the same antenna or antennas. High efficiency may be achieved when the transmission and reception occur simultaneously on the same radio channel. Transmitting and receiving on the same channel is known as full duplex. High-power transmitted signals with low-power received signals may lead to self-interference of the transmitted signal into the received signal, where the self-interference arises from leakage of the transmitted signal into the received signal path. This leakage may be due to reflections of the transmitted signal from the antenna, other components in the RF chain, or from the local environment. That is, the received signal contains the desired signal plus self-interference.

SUMMARY

An embodiment method for determining self-interference in radio full duplex includes transmitting, by a first radio transmitter and an antenna, a first signal and receiving, by a first radio receiver and the antenna, a reflection of the first signal. The method also includes estimating a channel in accordance with the first signal and the reflection of the first signal to produce an estimated channel and determining a second signal in accordance with the estimated channel. Additionally, the method includes transmitting, by a second radio transmitter, the second signal and removing a self-interference component of the reflection of the first signal to produce a corrected signal. Also, the method includes receiving, by a second radio receiver, the corrected signal.

An embodiment radio full duplex system includes an antenna and a first transmitter coupled to the antenna, where the first transmitter is configured to apply a first signal to the antenna, and where the antenna is configured to transmit the first signal. The radio full duplex system also includes a first receiver coupled to the antenna, where the first receiver is configured to receive a reflection of the first signal and a channel estimation module coupled to the first receiver, where the channel estimation module is configured to estimate a channel in accordance with the reflection of the first signal and the first signal. Additionally, the radio full duplex system includes a second transmitter and the channel estimation module, where the second transmitter is configured to determine a second signal in accordance with the estimated channel, and where the second transmitter is configured to apply the second signal to a coupler and the coupler coupled to the second transmitter, where the coupler is configured to remove a self-interference component of the reflection of the second signal to produce a corrected signal. Also, the radio full duplex system includes a second receiver coupled to the antenna, where the antenna is configured to receive the corrected signal.

An embodiment full duplex radio system includes an antenna configured to transmit a first signal and receive a reflection of the first signal. The antenna is also configured to transmit a second signal, remove a self-interference component of the reflection of the first signal to produce a corrected signal, and receive the corrected signal. The full duplex radio system also includes a processor coupled to the antenna and a computer readable storage medium storing programming for execution by the processor, the programming including instructions to estimate a channel in accordance with the first signal and the reflection of the first signal to produce an estimated channel.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
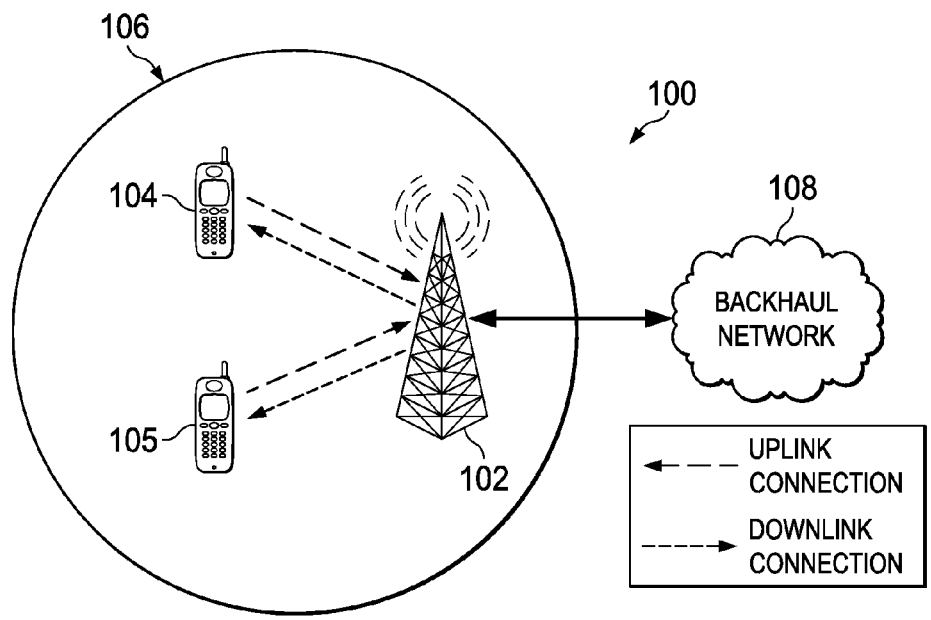
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present.

Communications controller 102 may be any component capable of providing wireless access by, inter alia, establishing uplink (dashed line) and/or downlink (dotted line) connections with UE 104 and UE 105, such as a base station, an enhanced base station (eNB), an access point, a picocell, a femtocell, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, femtocells, etc. Network 100 may be a cellular network or a WiFi network.

UEs 104 and 105 and communications controller 102 may contain full duplex antennas, which transmit and receive simultaneously. Full duplex antennas may experience self-interference, where a signal transmitted by the transmitter interferes with a signal received by the receiver. In an embodiment, the self-interference is estimated and canceled out. A transmitted signal is known in its original form, but may undergo distortion through the transmission process, so that the self-interference is significantly different than the original form. These distortions may be known as the channel. An embodiment digitally samples the self-interference. The samples may be a complex baseband or passband representation of the signal. Then, the channel is estimated by comparing the self-interference to the original form using a least-squares algorithm. The estimated channel is then applied to the original signal and subtracted from the total desired plus self-interference signal. Thus, the self-interference is reduced with minimal effect on the desired received signal.

Additional details on interference cancellation for full duplex antennas are disclosed by the U.S. patent application Ser. No. 13/739,927 entitled "Interference Cancellation for Division Free Duplexing or Full Duplex Operation" filed on December, 2013 which application is hereby incorporated herein by reference.

Figure 2:
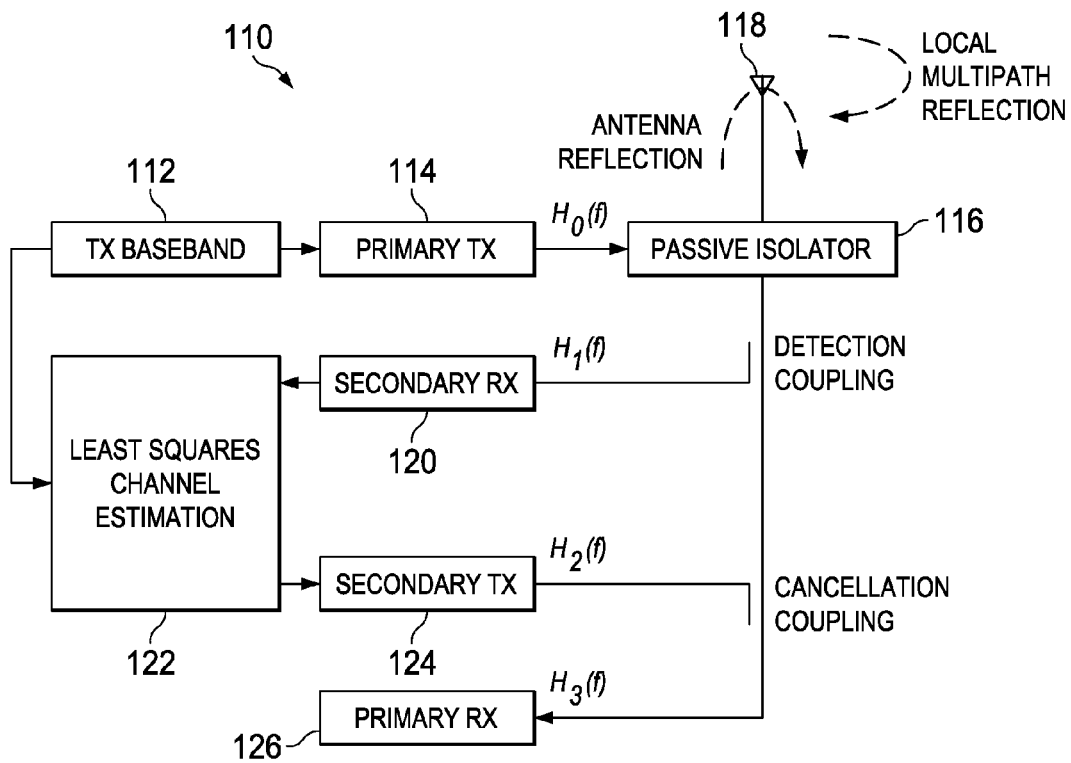
FIG. 2 illustrates a block diagram of an antenna system for radio full duplex.

FIG. 2 illustrates a block diagram of antenna environment 110. Transmitted baseband block 112 contains the transmitted baseband signal, which is a known signal $y_o$.

Primary transmitter 114, a radio transmitter, transmits the baseband signal $y_o$ from baseband block 112. Primary transmitter 114 may contain filters, up-converters, amplifiers, or other devices that may be used in a radio transmitter. Primary transmitter 114 generates a radio frequency alternating current which is applied to antenna 118 for transmission. In one example, the baseband signal has repetitive aspects, such as orthogonal frequency division multiplexing (OFDM) with a cyclic prefix.

The transmitted signal is fed through isolation block 116 to antenna 118. Then, antenna 118 radiates radio waves based on the applied signals. Isolation block 116 provides some separation or rejection of the transmitted signal from the received signal using the same antenna, antenna 118. Thus, isolation block 116 provides some initial rejection of the self-interference. In one example, isolation block 116 is a three-port RF component known as a circulator. With an ideal circulator, the signal transmitted from primary transmitter 114 would only propagate in the direction of the antenna 118, and the received signal from antenna 118 would only propagate in the direction from the antenna 118 to primary receiver 126. With a practical circulator, there is some leakage between the paths. Because the transmitted signal is so much stronger than the received signal, even a small amount of leakage causes significant self-interference. Alternatively, isolation block 116 is an active isolator.

Antenna 118 reflects a portion of the transmitted signal. Also, antenna 118 collects reflections of the transmitted signal from local objects. These reflections contribute to the distortion of the original signal, and thus the self-interference. In an example, about 5-10% of a transmitted signal is reflected. Because the transmitted signal may have a much higher power than the received signal, self-interference poses a significant problem. The self-interference is a linearly distorted version of the transmitted signal.

Secondary receiver 120 receives the signal transmitted by primary transmitter 114, and samples the self-interference at the receive port of isolator block 116.

Channel estimation block 122 estimates the channel using least squares channel estimation. As an example, this least squares algorithm may process 2000 samples of the known signal from baseband block 112, which are compared to 2000 samples received by antenna 118. Channel estimation is performed based on the baseband signal $y_o$ and the received signal from secondary receiver 120. The received signal may be modeled as:

$$y = Xh + n,$$

where $x = \{x_0, x_1, \ldots, x_{N-1}\}$ is a block of samples of the original signal, $y = \{y_1, y_2, \ldots y_{N-1}\}$ is a corresponding block of the sampled received signal, $h = \{h_0, h_1, \ldots h_{M-1}\}$ is the channel to be estimated, and $n = \{n_0, n_1, \ldots, n_{N-1}\}$ represents the contribution of the unknown received desired signal and nose. The data matrix X is defined by:

$$X = \begin{bmatrix} x_n & x_{n-1} & \ldots & x_{n-M+2} & x_{n-M+1} \\ x_{n+1} & x_n & x_{n-1} & \ldots & x_{n-M} \\ x_{n+2} & x_{n+1} & x_n & \ldots & x_{n-M} \\ \vdots & \vdots & \vdots & \vdots & \vdots \\ \vdots & \vdots & \vdots & \vdots & \vdots \\ x_{n+N-2} & x_{n+N-3} & \ldots & x_{n+N-M} & x_{n+N-M-1} \\ x_{n+N-1} & x_{n+N-2} & x_{n+N-3} & \ldots & x_{n+N-M} \end{bmatrix}.$$

The value of n in the definition of X may be zero, and $x_k$ for k<0. In another example, the value of n is any positive integer less than N-M. In one example, only a portion of the samples is used. When the baseband signal has a repetitive aspect, the data matrix X may be implemented as a circulant matrix, which may simplify some of the calculations Then, h may be solved for using the least squares algorithm. In one example, the transmitted signal uses a known sequence is used, so part of the calculation may be pre-computed. Alternately, the transmitted signal is not known a priori but only at the time of transmission. The dimension M of h affects both the accuracy of the channel estimation and the complexity of the implementation. The accuracy of the channel estimate is proportional to N/M, assuming M is large enough to characterize the channel. For some embodiments, the complexity of the computation is proportional to $NM^2$ Once h is known, it is applied to the next block of original signal samples $x^{(1)}$ to obtain the estimated self-interference $y^{(2)}$. This estimated self interference is subtracted or canceled from the received signal to obtain the signal r to be fed to primary receiver 126. That is:

$$r = y^{(2)} - \hat{y}^{(2)}.$$

The signal to be transmitted is converted back to the analog domain if the digital domain is used for channel estimation, and is transmitted by secondary transmitter 124 for cancelation coupling. The cancellation may occur at either baseband or passband frequency.

The transmitted signal is then received by primary receiver 126.

The auxiliary path may also include a device such as an equalizer to minimize the distortion caused by the auxiliary path. The equalizer may be placed between the secondary receiver 120 and the secondary transmitter 124.

Figure 3:
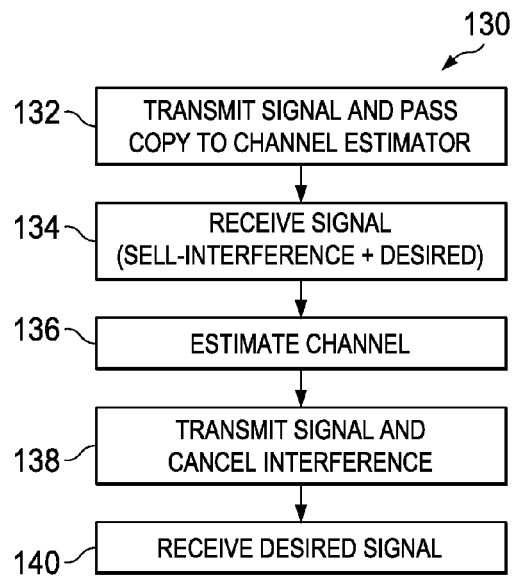
FIG. 3 illustrates a flowchart of an embodiment method of determining self-interference for radio full duplex.

FIG. 3 illustrates flowchart 130 for a method of reducing self-interference in radio full duplex. Initially, in step 132, the primary transmitter transmits a baseband signal. A copy of the baseband signal is provided to the channel estimation block 122. Alternatively, a passband signal is used. The signal is transmitted by an antenna, passing through an isolation block, which provides isolation between the transmitted signals and the received signals.

Then, in step 134, the secondary receiver receives and samples the signal transmitted in step 132. The received signal has been distorted by the channel. The received signal also passes through the isolation block.

Next, in step 136, the channel is estimated. This is done using the known transmitted signal and the received signal. A least squares method may be used.

In step 138, a signal is transmitted by the secondary transmitter. This is done taking into account the channel that was estimated in step 134.

Finally, in step 140, the signal transmitted in step 138 is subtracted from the signal at the receive port of the isolation block, and the difference is received by the primary receiver.

In an example embodiment, this procedure is repeated for each time slot. With a new estimate every time slot, small changes in hardware characteristics may be quickly detected. This helps to maintain a high degree of accuracy. In an alternative implementation, suitable for the case where the hardware (channel) characteristics are not expected to change quickly, the channel could be estimated in one time slot and the same channel estimate could be used for multiple subsequent time slots, before re-estimating the channel.

By transmitting a known signal at regular intervals, some calculations may be pre-computed and stored. This reduces the implementation complexity.

In one embodiment, a system has two or more antennas where one subset of the antennas is used for transmitting and another subset of the antennas is used for receiving. If there is significant interference from the transmitting antennas to the receiving antennas, self-interference cancelation may be used.

Figure 4:
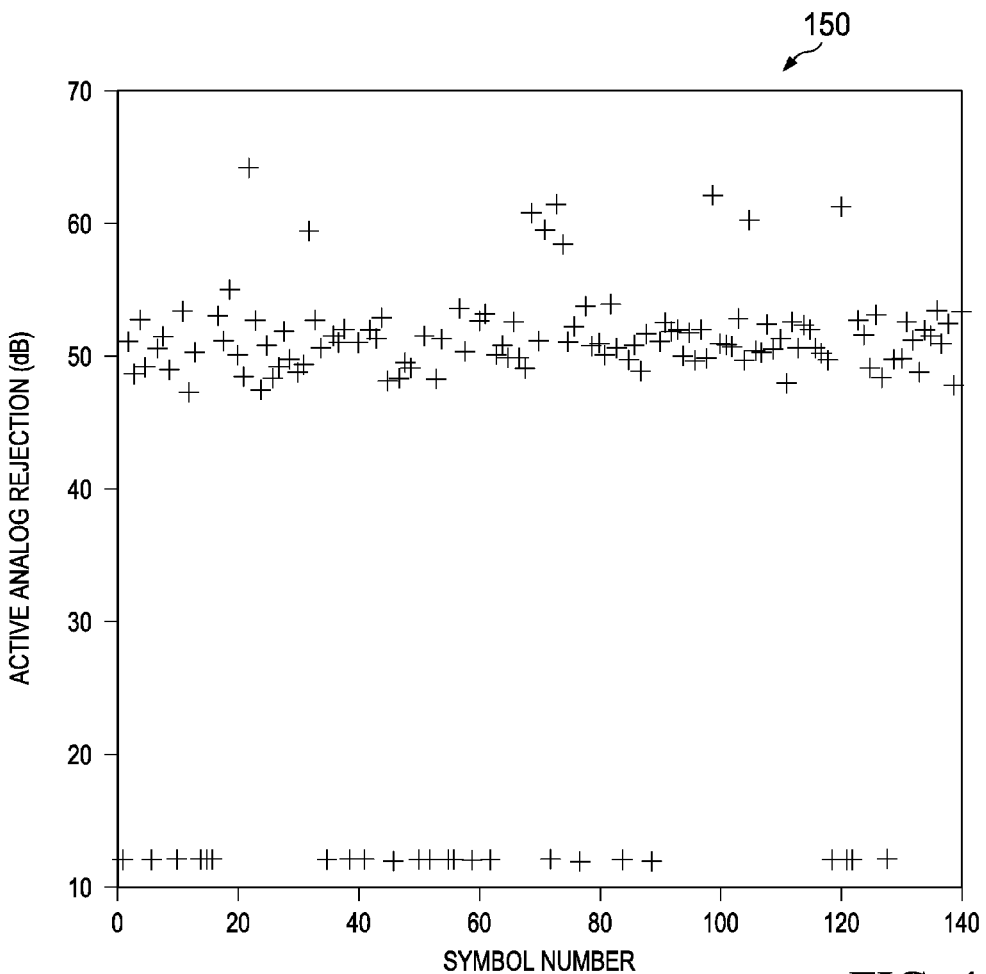
FIG. 4 illustrates a graph of self-interference rejection versus slot number (i.e. time) for correlation estimation.

FIG. 4 illustrates graph 150, a rejection of self-interference versus slot number graph for an alternative self-interference algorithm based on correlation techniques. The graph shows inconsistent performance with this algorithm in multipath fading. For this graph, the multipath delay profile is exponential at around 300 ns; there is no transmitter and receiver impairments; and the UE signal power level relative to the self-interference is −60 dBr.

Figure 5:
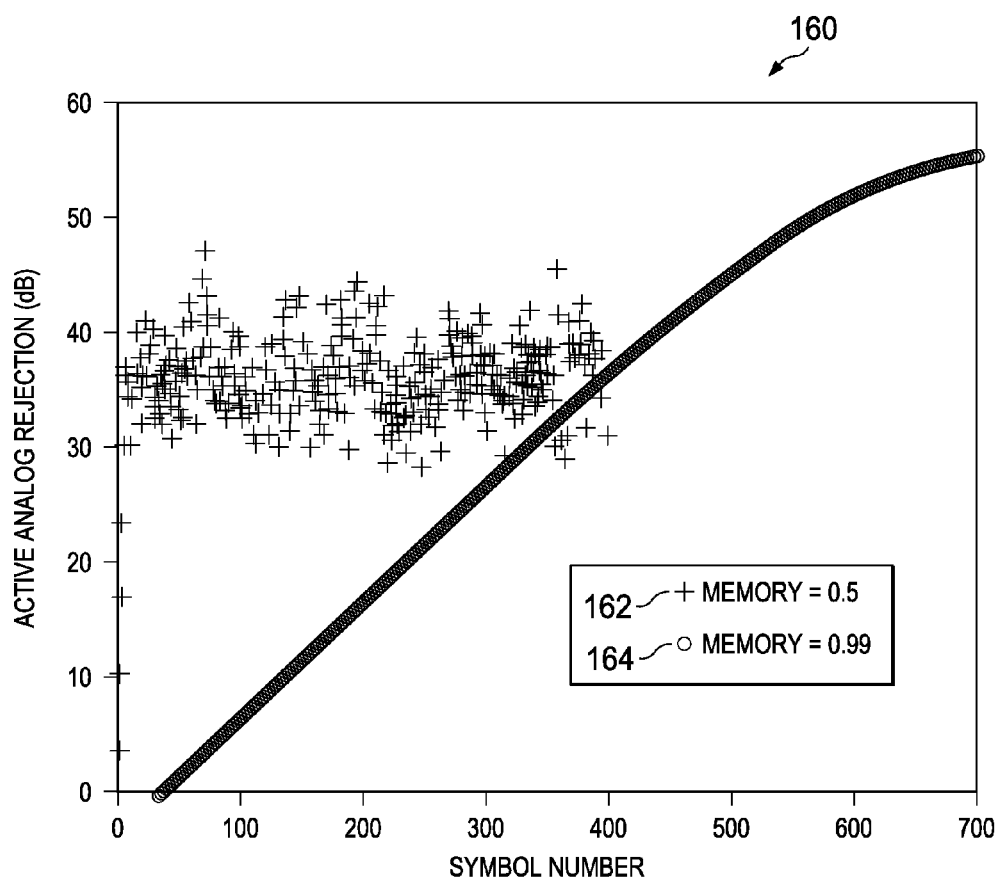
FIG. 5 illustrates a graph of self-interference rejection versus slot number for frequency estimation.

FIG. 5 illustrates graph 160 of rejection of self-interference versus slot number for an algorithm that estimates the channel in the frequency domain assuming an orthogonal frequency division multiplexing (OFDM) signal format. Points 162 are for an algorithm memory factor of 0.5 and points 164 are for a memory of 0.99. With this algorithm, there is slower convergence to a good channel estimate. For this graph, the multipath channel is static; the multipath delay profile is exponential at about 300 ns; there are no transmitter and receiver impairment; and the UE signal power level relative to the self-interference is −60 dBr.

Figure 6:
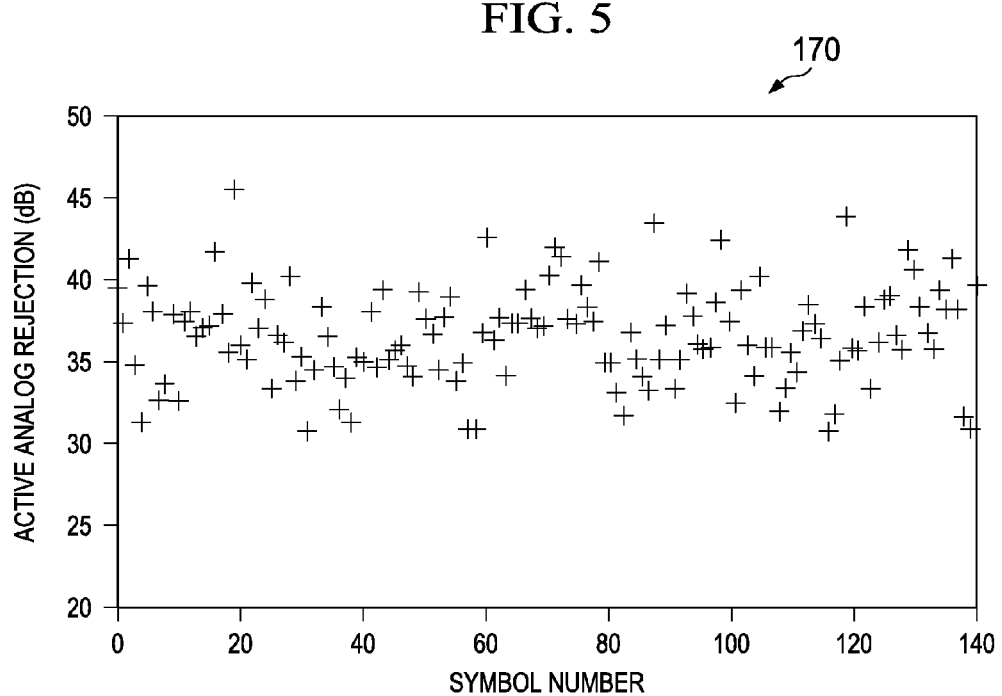
FIG. 6 illustrates a graph of self-interference rejection versus slot number for least square estimation.

FIG. 6 illustrates graph 170 for rejection versus slot number for least squares estimation. There is good performance in multipath fading, with a fading rate of 3 Hz. The multipath delay profile is exponential at about 300 ns. There is linear distortion in the main transmitter. The UE signal relative to self-interference is −60 dBr.

Figure 7:
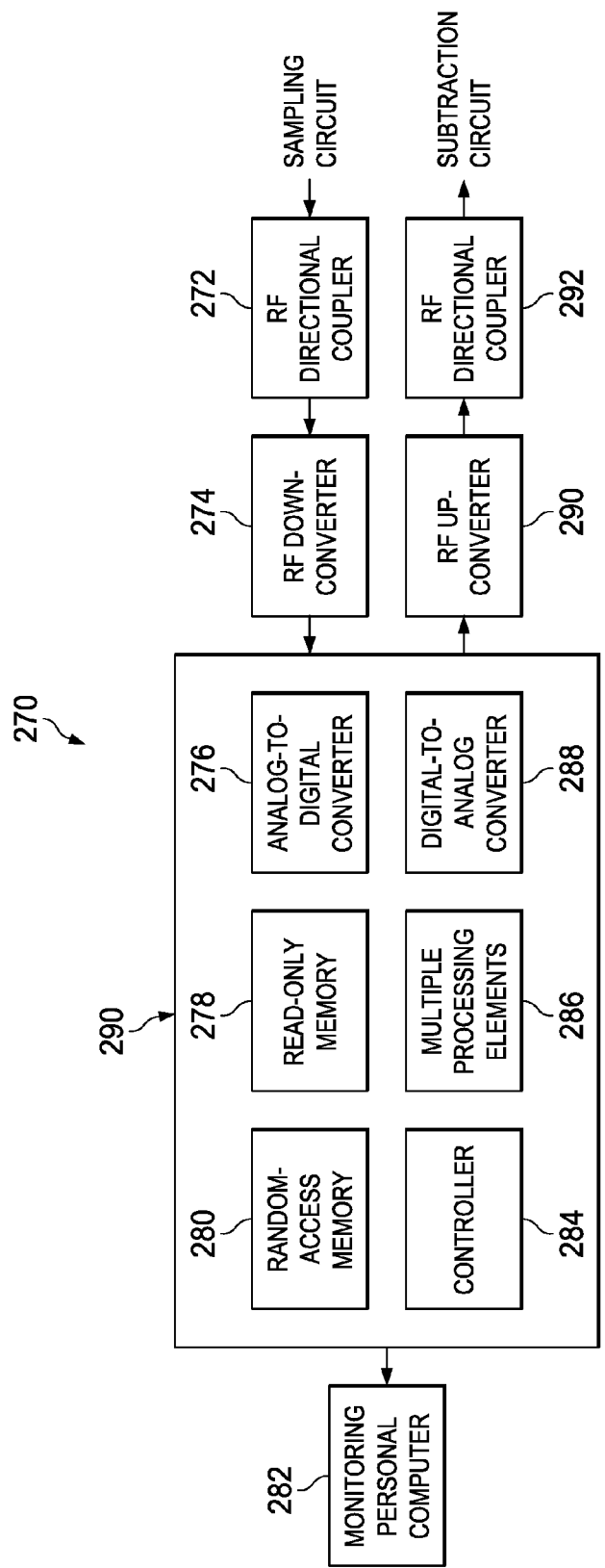
FIG. 7 illustrates a block diagram of an embodiment system for radio full duplex.

FIG. 7 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, down-converters, up-converters, etc. The processing system may include one or more processing component and their associated memory. In an embodiment, directional coupler 272, a radio frequency (RF) directional coupler, is used to sample a received signal containing the self-interference plus the desired signal.

This sampled signal is down-converted by down-converter 274, an RF down-converter.

The down-converted signal is then converted to digital samples in analog-to-digital converter 276 in digital module 290.

The digital signal is then processed by multiple processing elements of processing unit 286, which are organized and connected by controller 284. Controller 284 stores its program in read-only memory 278, and stores interim processing results in random-access memory 280.

The output of the digital signal processing is converted back to analog form by digital-to-analog converter 288.

Next, the analog signal is up-converted by up-converter 290, an RF up-converter.

Finally, the up-converted signal is subtracted from the main signal by means of directional coupler 292, an RF directional coupler.

Monitoring personal computer (PC) 282 may be connected to the processing unit 286.

In some embodiments, some or all of the components may be combined in a device known as a field-programmable gate array (FPGA) or an application-specific integrated circuit (ASIC). While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for determining self-interference in radio full duplex, the method comprising:

transmitting, by a first radio transmitter, a first signal over a common antenna via a transmit port of a duplexer;

receiving, by a first radio receiver, a reflection of the first signal over a receive port of the duplexer, the reflection of the first signal having been reflected off the common antenna;

estimating a self-interference channel in accordance with a data matrix of the first signal and the reflection of the first signal, the self-interference channel representing how reflected portions of signals transmitted by the first radio transmitter propagate after being reflected off the common antenna;

generating a self-interference cancelation signal in accordance with the self-interference estimated channel and a full-duplexed transmit (TX) signal;

simultaneously transmitting the full-duplexed TX signal and receiving a full-duplexed receive (RX) signal over the common antenna, wherein the full-duplexed TX signal is transmitted by the first radio transmitter and the full-duplexed RX signal is received by a second radio receiver;

transmitting, by a second radio transmitter, the self-interference cancelation signal over a link between the receive port of the duplexer and the second radio receiver during a period in which the full-duplexed RX signal is received by the second radio receiver, the self-interference cancellation signal at least partially subtracting a self-interference component corresponding to a reflection of the full-duplexed TX signal from the full-duplexed RX signal to produce a corrected full-duplexed RX signal; and receiving, by the second radio receiver, the corrected full-duplexed RX signal.

2. The method of claim 1, wherein estimating the self-interference channel comprises performing least squares channel estimation.

3. The method of claim 1, wherein the first signal is a passband signal.

4. The method of claim 1, wherein the first signal is a baseband signal.

5. The method of claim 1, wherein the duplexer is a passive isolator.

6. The method of claim 1, wherein the duplexer is an active isolator.

7. The method of claim 1, wherein estimating the self-interference channel comprises continuously estimating the self-interference channel.

8. The method of claim 1, wherein estimating the self-interference channel comprises intermittently estimating the self-interference channel.

9. The method of claim 8, wherein the first signal is known a priori information.

10. The method of claim 1, wherein the self-interference channel is estimated while previous full-duplexed TX and RX signals are communicated over the common antenna.

11. An apparatus comprising:
a common antenna;
a duplexer coupled to the common antenna;
a first radio transmitter coupled to a transmit port of the duplexer, the first radio transmitter configured to transmit a first signal over the common antenna via the transmit port of the duplexer;

a first radio receiver coupled to a receive port of the duplexer, the first radio receiver configured to receive a reflection of the first signal over the receive port of the duplexer, the reflection of the first signal having been reflected off the common antenna;

at least one processor configured to estimate a self-interference channel in accordance with a data matrix of the first signal and the reflection of the first signal, and to generate a self-interference cancelation signal in accordance with the self-interference estimated channel and a full-duplexed transmit (TX) signal, wherein the self-interference channel represents how reflected portions of signals transmitted by the first radio transmitter propagate after being reflected off the common antenna;

a second radio receiver coupled to the receive port of the duplexer, the first radio transmitter and the second radio receiver being configured to simultaneously transmit the full-duplexed TX signal and to receive a full-duplexed receive (RX) signal over the common antenna, respectively;

a second radio transmitter configured to transmit the self-interference cancelation signal over a link between the receive port of the duplexer and the second radio receiver during a period in which the full-duplexed RX signal is received by the second radio receiver, the self-interference cancellation signal at least partially subtracting a self-interference component corresponding to a reflection of the full-duplexed TX signal from the full-duplexed RX signal to produce a corrected full-duplexed RX signal; and the second radio receiver configured to receive the corrected full-duplexed RX signal.

12. The apparatus of claim 11, wherein estimating the self-interference channel comprises performing least squares channel estimation.

13. The apparatus of claim 11, wherein the first signal is a passband signal.

14. The apparatus of claim 11, wherein the first signal is a baseband signal.

15. The apparatus of claim 11, wherein the duplexer is a passive isolator.

16. The apparatus of claim 11, wherein the duplexer is an active isolator.

17. The apparatus of claim 11, wherein the instructions to estimate the self-interference channel include instructions to continuously estimate the self-interference channel.

18. The apparatus of claim 11, wherein the instructions to estimate the self-interference channel include instructions to intermittently estimate the self-interference channel.

19. The apparatus of claim 18, wherein the first signal is known a priori information of the apparatus.

20. The apparatus of claim 11, wherein the self-interference channel is estimated while previous full-duplexed TX and RX signals are communicated over the common antenna.

* * * * *